Feb. 18, 1930.　　　C. F. JENKINS　　　1,747,173

RADIO VISION ANALYSIS

Filed March 14, 1925

Witness:
Florence W. Anthony

Inventor
C. Francis Jenkins

Patented Feb. 18, 1930

1,747,173

UNITED STATES PATENT OFFICE

CHARLES FRANCIS JENKINS, OF WASHINGTON, DISTRICT OF COLUMBIA, ASSIGNOR TO JENKINS LABORATORIES, OF WASHINGTON, DISTRICT OF COLUMBIA, A CORPORATION OF THE DISTRICT OF COLUMBIA

RADIO VISION ANALYSIS

Application filed March 14, 1925. Serial No. 15,587.

This invention relates to apparatus for the transmission of photographs by radio, and has for its principal object a method whereby greater latitude of operation is obtained.

Heretofore, before applicant took up research and development work in the transmission of photographs by electricity, i. e., by wire or by radio, it was the practice, where light sensitive cells were employed, to put a minute aperture in front of the light cell, the aperture being very small, say, one-hundredth of an inch in diameter, when the picture to be sent is scanned in a hundred lines to the inch. Such a small aperture often acts as a pinhole camera, and requires very careful and exact adjustment to even partially overcome the difficulties involved.

To entirely avoid this difficulty and make the machines easily operated by any one, a relatively large opening in front of the light cell is provided, and the image of the picture instead of the picture itself is caused to cross the cell aperture. The aperture can, therefore, be so large, say, ¼ to ½ inch, that exactness in size is not required, while the projected image can be enlarged until it bears the same relative proportion, aperture-to-picture surface, namely, one-hundredth of the picture image surface.

With this and other objects in view the invention consists in the novel details of assembly of the various devices employed, hereinafter disclosed and particularly pointed out in the claims.

Referring to the accompanying drawings forming a part of these specifications—

Figure 1:
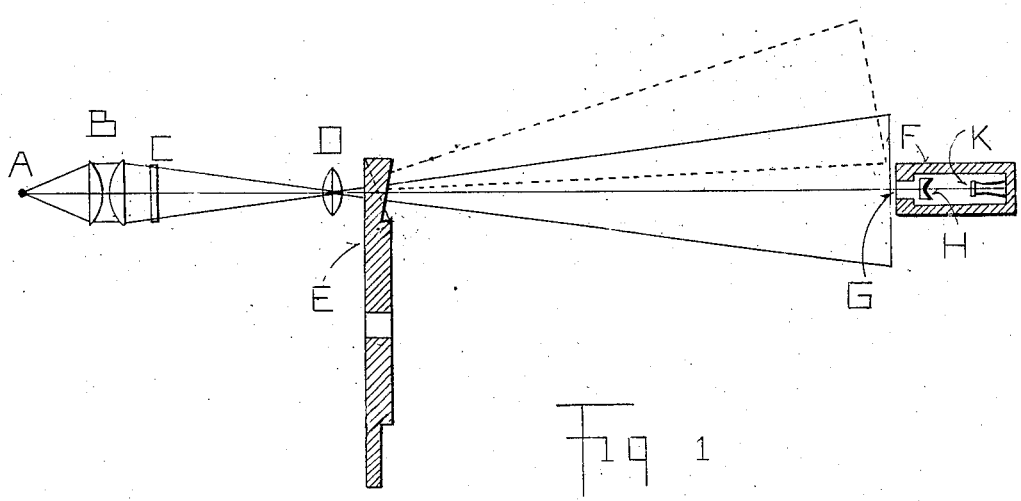
Figure 2:
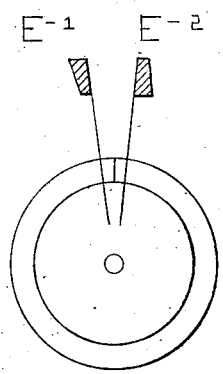

In the drawings Fig. 1 is a schematic drawing in elevation, and Fig. 2 an illustration of the prismatic ring.

In the drawings A is a source of light, B a pair of condensers, C a picture, D an objective, E a prismatic plate (in section), F a light sensitive cell box, G an aperture therein, H a negative lens for spreading the entering light over the entire area of the light cell K.

In Fig. 2 the prismatic plate (Patent No. 1,385,325) is illustrated, with sections of the ring prism portion $E^1$ and $E^2$ on either side of the meeting ends of the prism ring.

To those familiar with the behavior of a beam of light passing through the prismatic ring in rotation, the operation of the apparatus illustrated is well understood, i. e., the rotation of the prismatic ring E causes an image of the picture C to sweep downward across the aperture G of the cell box F, admitting so much of the picture image as the ratio of the aperture area bears to the area of the picture. It will readily be seen, therefore, that a slight difference in the exactness of size of the aperture-to-picture image is quite unimportant, while the same inexactness in the size of an aperture which bears the same ratio relation to the picture (C) itself would be fatal.

The new method gives, therefore, a latitude and dependability in operation not attainable by any other scheme heretofore proposed, and makes the apparatus practical in industry and quite easily operated by even a novice.

It will be well understood that in the place of a picture C an object, or the image of an object or scene, might be employed; and the word "picture" will, therefore, be used herein to mean any of these.

What I claim is—

1. The method of converting the light values of a picture or the like into electric current values which consists in enlarging said picture by projection, proportionately enlarging the aperture of a single light sensitive cell to preserve the same dimensional relations between the enlarged aperture as exists between the original image and the ordinary aperture before enlargement, then causing the said projected image to sweep over the said enlarged aperture of the light sensitive cell spreading the light passing through said aperture over the greater part of the cell area, and adjusting the several elements until the cell scans a predetermined area of the projected image.

2. In combination, means for producing an enlarged image of a picture or the like, a single light-sensitive cell having an aperture enlarged proportionately to the enlargement of the said picture, means for sweeping the enlarged image of the picture in front of the enlarged aperture in the said single light-sensitive cell, the enlarged opening of the light-sensitive cell having dimensions small as compared with the dimensions of the image but sufficiently large to prevent "pin hole effects", and means for spreading the light passing through said aperture over the greater part of the cell area.

In testimony whereof I have affixed my signature.

CHARLES FRANCIS JENKINS.